United States Patent [19]
Kim

[11] Patent Number: 5,839,576
[45] Date of Patent: Nov. 24, 1998

[54] DISK STORAGE APPARATUS

[75] Inventor: Young S. Kim, Cupertino, Calif.

[73] Assignee: Inno Design, Inc., Palo Alto, Calif.

[21] Appl. No.: 939,378

[22] Filed: Sep. 29, 1997

[51] Int. Cl.$^6$ .................................................. B65D 85/30
[52] U.S. Cl. ...................................... 206/308.1; 206/310
[58] Field of Search ............................ 206/307.1, 308.1, 206/310, 311, 493; 312/9.58, 9.64

[56] References Cited

U.S. PATENT DOCUMENTS

| | | | |
|---|---|---|---|
| 4,535,888 | 8/1985 | Nusselder | 206/444 |
| 5,176,250 | 1/1993 | Cheng | 206/309 |
| 5,269,409 | 12/1993 | Brandt et al. | 206/309 |
| 5,322,162 | 6/1994 | Melk | 206/310 |
| 5,531,321 | 7/1996 | O'Brien et al. | 206/232 |
| 5,697,498 | 12/1997 | Weisburn et al. | 206/303 |

*Primary Examiner*—Paul T. Sewell
*Assistant Examiner*—Nhan T. Lam
*Attorney, Agent, or Firm*—Flehr Hohbach Test Albritton & Herbert LLP

[57] ABSTRACT

A disk storage apparatus for retaining a plurality of disks. The disk apparatus includes a base having spaced first and second edges and third and fourth edges extending between the first and second edges. At least one retaining frame is pivotally coupled to the base vicinal one edge thereof, and at least one retaining frame is pivotally coupled to the base vicinal another edge thereof. The disk apparatus also includes a plurality of disk retainers each adapted to engage a disk. At least one of the disk retainers is mounted to each retaining frame.

14 Claims, 5 Drawing Sheets

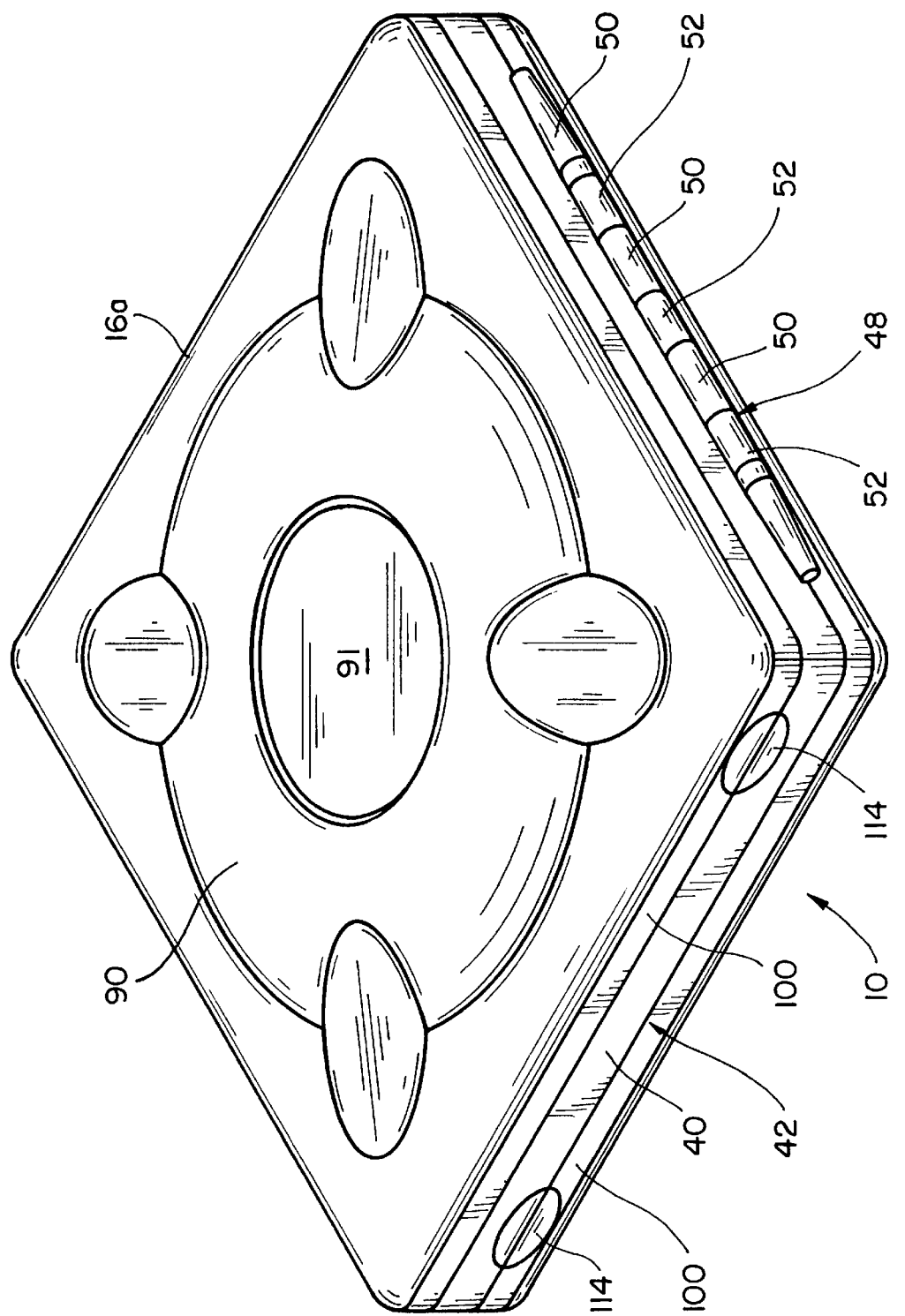
FIG_1

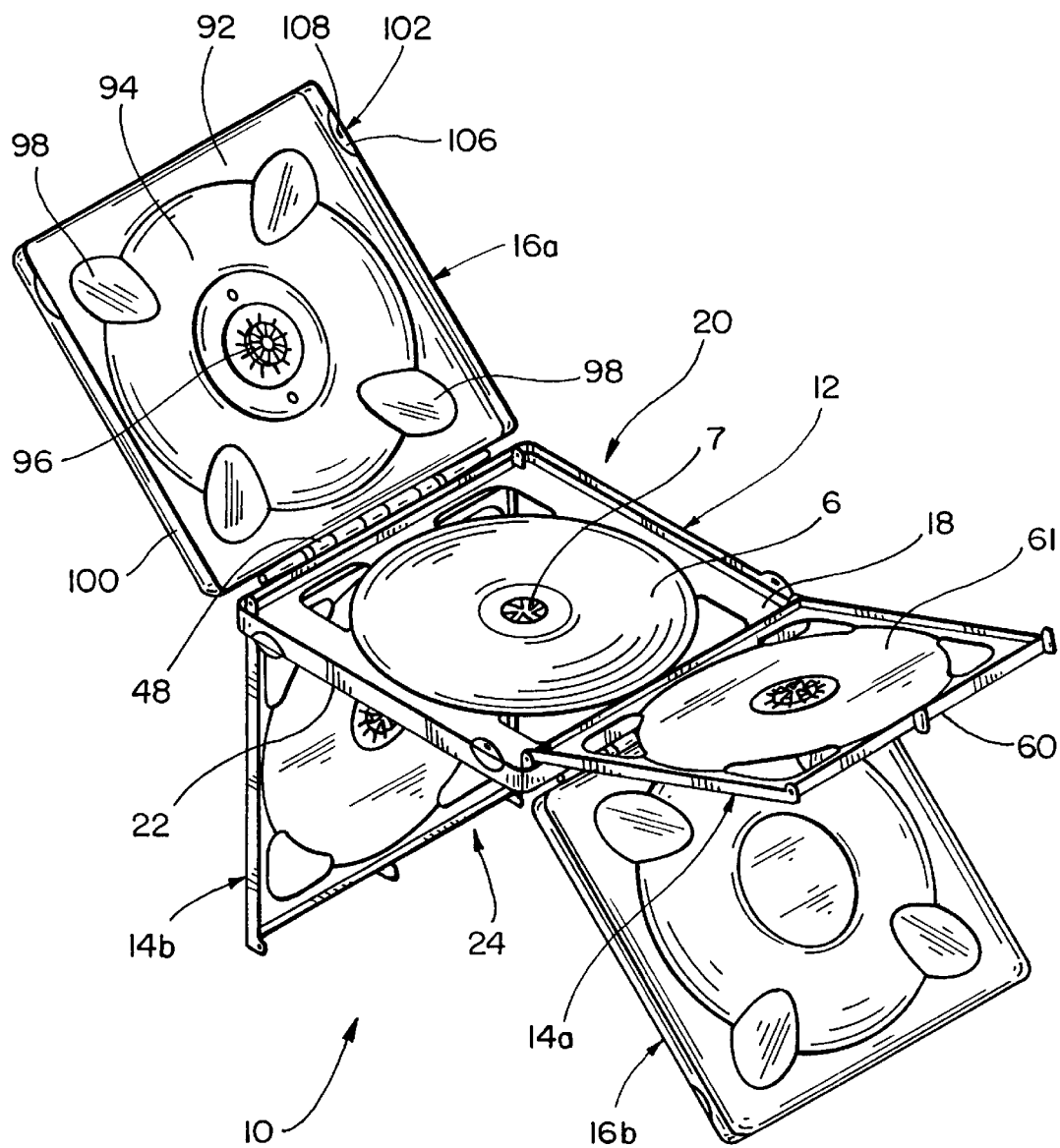
FIG_2

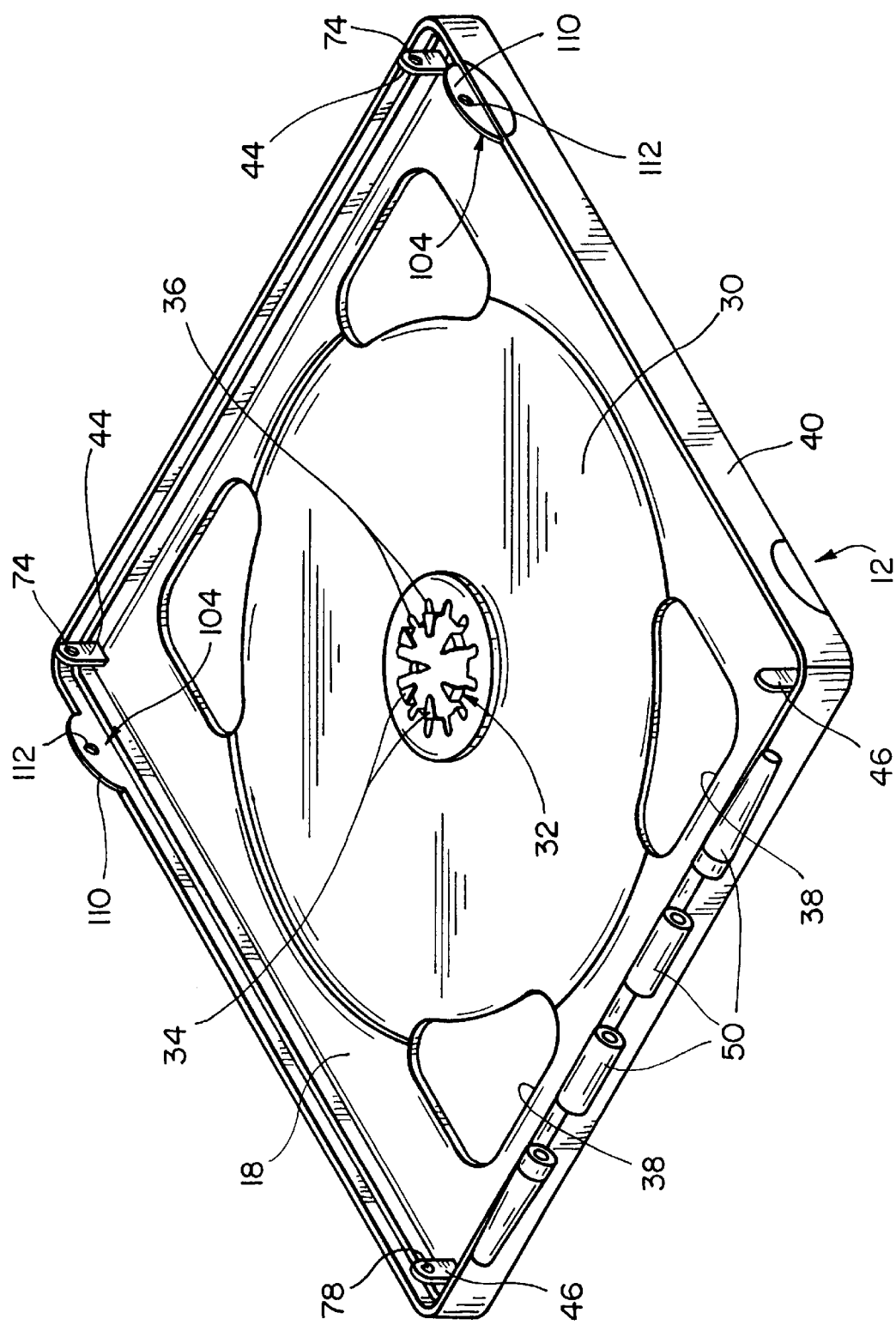
FIG_3

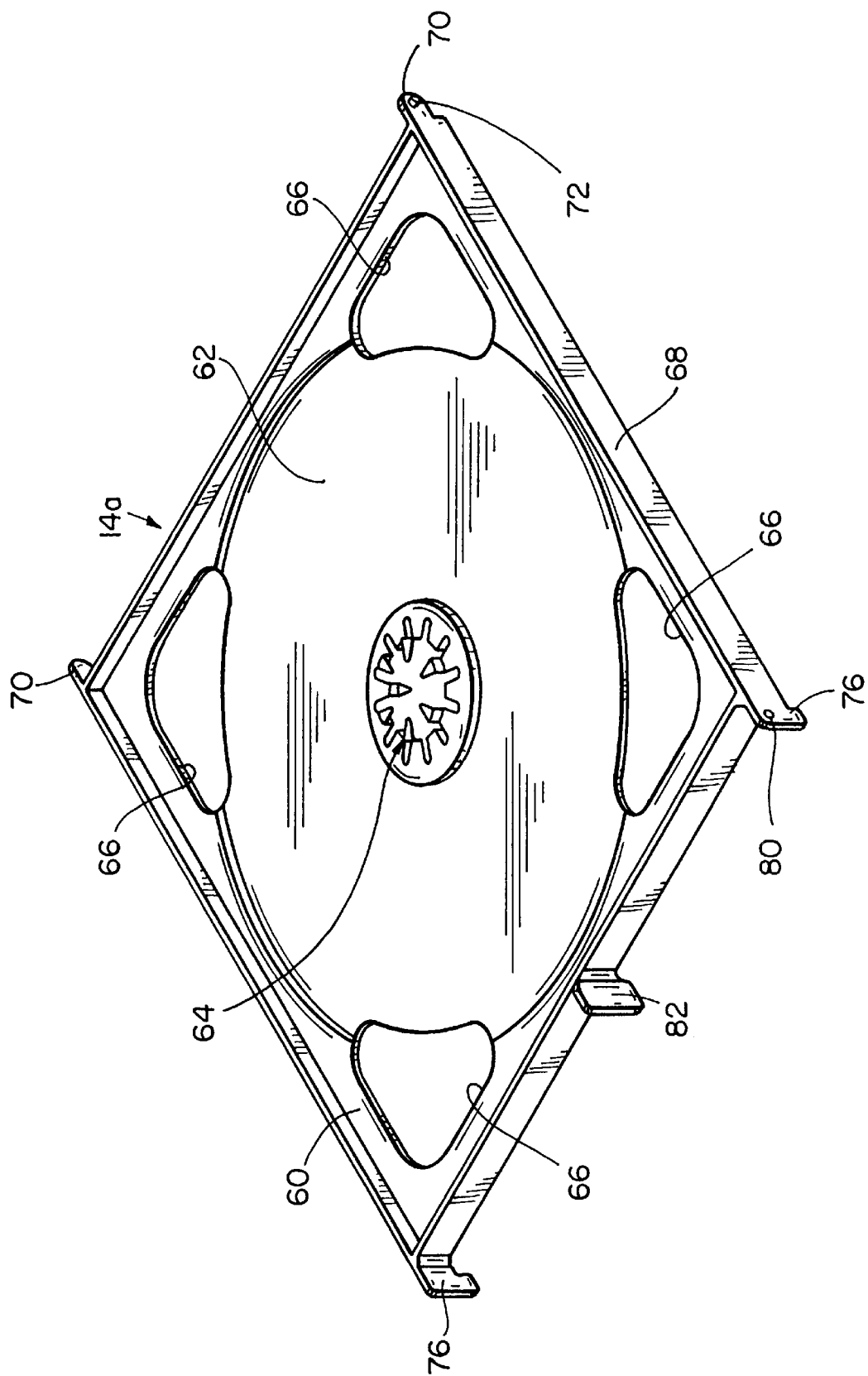
FIG_4

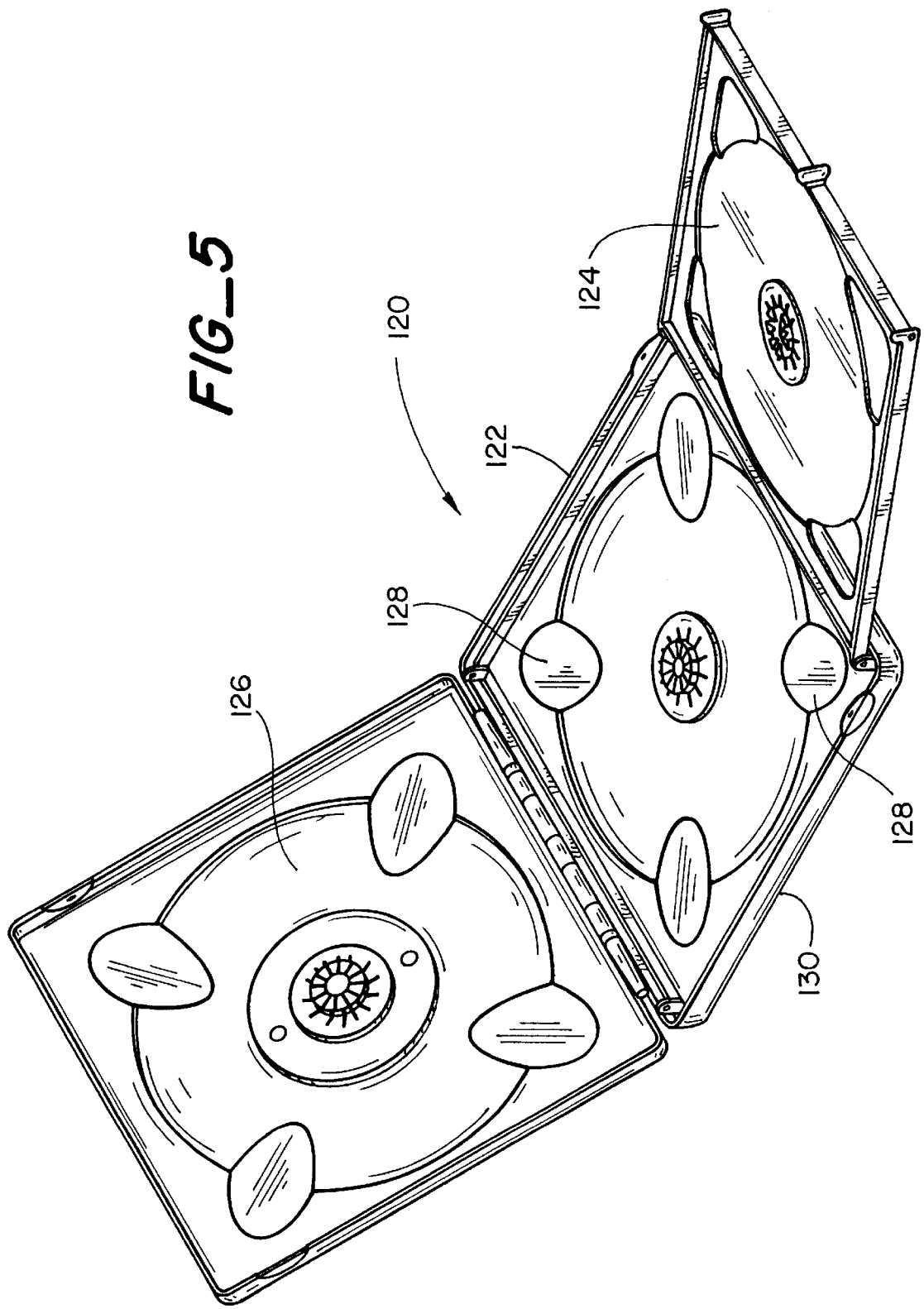
FIG_5

5,839,576

DISK STORAGE APPARATUS

BRIEF DESCRIPTION OF THE INVENTION

This invention relates in general to a storage apparatus and, more particularly, to an apparatus for storing a plurality of disks.

BACKGROUND OF THE INVENTION

Compact disks are widely used as a medium for data storage and for audio and video recordings. The compact disk has become the preferred medium for audio recordings and is becoming even more popular for video recordings with the introduction of improved digital video disks and associated video equipment. CD-ROMs, with their large storage capacity and the ease with which the data may be accessed, are widely used as a storage media for information, with dictionaries, encyclopedias, telephone listings, research materials and numerous other types of information being stored on disk. CD-ROMs are also used to distribute software and in many instances data retained on the disk is accessed by the program during operation of the software. As a result of their popularity, consumers typically own a large number of disks. A system for conveniently storing several disks within the convenient reach of the consumer is desirable.

Numerous storage boxes, racks, shelves and the like are available for storing compact disks in their protective containers. Most of these storage devices are bulky and require the user to identify the disks by reading the information on the edge of the plastic container. This label typically has a height of about ¼ inch, and may be difficult to read unless the user is directly in front of the label. U.S. Pat. No. 5,232,089 discloses an example of a compact disk holder which conveniently retains a plurality of disks in a holder with the front of the plastic cover exposed to the user. The lid of the disk container may be opened and the disk removed without removing the container from the holder.

Storing the compact disk in its original plastic container provides protection for the disk and retains any information carried by the container with the disk. However, the overall space required to store several compact disks may be significantly reduced by storing the thin disks outside of the plastic containers. Moreover, in many instances all the necessary information is imprinted on the disk itself or in a separate manual, making the information carried by the plastic cover of no use to the user. Various storage devices are available for storing loose disks. Typically, the disks are individually inserted into a compartment in a plastic sleeve which is retained in an outer case. While this type of storage device may be used to protect and store several disks without their original containers, removing the disks from the sleeves is often awkward and time consuming. Moreover, although the plastic sleeve is formed of a relatively transparent material, the plastic may impair the user's ability to clearly read the information imprinted on the front of the disk. A storage device for conveniently and attractively storing a plurality of compact disks is desirable. A storage device which retains the disks so that the user may quickly locate the desired disk and retrieve the disk from the holder is also desirable.

OBJECTS AND SUMMARY OF THE INVENTION

It is a primary object of this invention to provide a disk storage apparatus for storing a plurality of compact disks.

It is a further object of this invention to provide a disk storage apparatus for protectively retaining several disks outside of their original container.

It is another object of this invention to provide a disk storage apparatus in which a selected disk may be easily located by the user and then removed from the container.

It is still another object of this invention to provide a disk storage apparatus which requires a smaller storage area to retain the disks than is required to store the disks in their original containers.

A more general object of this invention is to provide an apparatus for storing compact disk containers which is convenient to use, may be efficiently and inexpensively manufactured, and which has an attractive appearance.

In summary, this invention provides a disk storage apparatus for retaining a plurality of disks. The disk apparatus includes a base having spaced first and second edges and third and fourth edges extending between the first and second edges. At least one retaining frame is pivotally coupled to the base vicinal one edge thereof, and at least one retaining frame pivotally coupled to the base vicinal another edge thereof. The disk apparatus also includes a plurality of disk retainers each adapted to engage a disk, with at least one of the disk retainers being mounted to each retaining frame.

Additional objects and features of the invention will be more readily apparent from the following detailed description and appended claims when taken in conjunction with the drawings.

BRIEF DESCRIPTION OF THE DRAWINGS

FIG. 1 shows a pictorial view of a disk storage apparatus in accordance with the present invention, shown in the closed position.

FIG. 2 shows a pictorial view of the disk storage apparatus of FIG. 1, shown in a fully open position.

FIG. 3 shows a pictorial view of the base of the disk storage apparatus of FIG. 1.

FIG. 4 shows a pictorial view of a retaining frame of the disk storage apparatus of FIG. 1.

FIG. 5 shows a pictorial view of a disk storage apparatus in accordance with another embodiment of the invention, shown in the open position.

DETAILED DESCRIPTION OF THE INVENTION

Reference will now be made in detail to the present embodiments of the invention, which are illustrated in the accompanying figures. Turning now to the drawings, wherein like components are designated by like reference numbers throughout the various figures, attention is directed to FIGS. 1–4.

Disk storage apparatus 10, constructed in accordance with the present invention, is particularly suitable for storing a plurality of compact disks outside of their original containers. In the illustrated embodiment, the storage apparatus 10 is adapted for use with standard compact disks 6, shown for example in FIG. 2, which have a diameter of about 4¾ inches and a central aperture 7 has a diameter of about ⅝ inch. However, it is to be understood that the disk storage apparatus may be adapted for use with other types of disks within the scope of this invention.

As is shown particularly in FIG. 2, disk storage apparatus 10 generally includes a base 12, inner frames 14a, 14b and outer members 16a, 16b. The upper surface 18 of the base 16, the inner frame 14a and the outer member 16a define an upper compartment 20 of the apparatus 10, while the lower surface 22 of the base, the inner frame 14b and the outer member 16b define a lower compartment 24 of the disk apparatus. The inner frames 14a, 14b and the outer members 16a, 16b are pivotally coupled to the base such that the frames 14a, 14b and outer members 16a, 16b are movable between the fully open position of FIG. 2 to the fully closed position, shown in FIG. 1, where the inner frames are sandwiched between the base 12 and the outer members 16a, 16b. Although both the upper and lower compartments 20, 24 are shown in the open position in FIG. 2 for the purposes of this description, during typical usage of the apparatus the user will partially or completely open only one compartment at a time.

In the present embodiment of the invention, the inner frames 14a and 14b are positioned on opposite sides of the base 12. Similarly, the outer members 16a and 16b are positioned on opposite sides of the base 12. With this configuration, the user may easily open the selected compartment of the disk apparatus 10 without inadvertently releasing the outer member of the other compartment. This is a particularly elegant feature of the disk apparatus of the present embodiment in that this arrangement substantially reduces or eliminates any awkwardness in obtaining access to the separate compartments of the apparatus. However, it is to be understood that in other modifications of the invention the inner frames 14a, 14b may be both positioned along one side of the base with both of the outer members 16a, 16b being positioned along another side of the base. Instead of positioning the retaining frame 14a on the side of the base 12 opposite the outer member 16a, it is to be understood that the retaining frame may be disposed along one of the other sides of the base.

Turning to FIGS. 2–4, the base, inner frames and outer members of the disk apparatus 10 will be described in greater detail. The upper surface 18 of the base 12 is shown in FIG. 3. The lower surface 22 is rotated 180° relative to the upper surface 18, but is in all other respects substantially identical to the upper surface 18. Thus, only the upper surface 18 will be described in detail with the description also applying to the lower surface. The upper surface 18 includes a recessed central region 30 shaped to receive a disk 6. A disk retainer 32 is positioned to engage the central aperture 7 of the disk. The disk retainer 32 includes a plurality of circumferentially spaced fingers 34 which frictionally engage the inner rim of the central aperture of the disk to securely hold the disk in place. The fingers 34 extend upwardly and inwardly toward the center of the circle defined by the fingers 34 and are separated by outward extending slots 36 so that the fingers 34 may be resiliently deformed to facilitate the application of the disk onto and removal of the disk from the retainer.

A plurality of openings 38 are formed through the base 12 at the outer region of the central portion 30. Preferably, the openings 38 extending inwardly into the central region 30 a sufficient distance so that the outer edge of the disk will extend partially across the opening 38, allowing the user to conveniently grip the outer edge of the disk and lift the disk from the retainer 32. As shown in FIG. 3, base 12 includes two sets of diametrically opposed openings 38 so that the user may conveniently engage opposite sides of the disk in either the left or right hand. However, it is to be understood that the position, number and size of the openings 38 may be varied within the scope of this invention.

A peripheral wall 40 extends upwardly from the upper surface 18. The walls 40 of the upper and lower surfaces 18 and 22 define a portion of the protective side casing of the closed apparatus 10, generally designated at 42 in FIG. 1. The remainder of the side casing is provided by the outer members 16a and 16b, providing the user with a convenient gripping surface for opening and closing the outer members. In other modifications of the invention, the walls 40 may comprise a major portion or even the entirety of the side casing 42 of the storage apparatus.

A pair of mounting arms 44 upstanding from one side of the base are used to mount the proximal edge of the inner frame 14a to the base 12. As is shown in FIG. 3, the arms 44 are positioned inside of the peripheral wall 40 so that the inner frame 14a is entirely enclosed within the outer casing defined by the outer members 16a, 16b and the peripheral walls 40 of the base 12. Latching arms 46 are provided at the opposite side of the base 12 to hold the inner frame 14a in the closed position until the user lifts the distal edge of the frame 14a to pivot the frame to the open position, preventing the inner frame from swinging upwardly when the outer member 16a is opened. However, it is to be understood that the latching arms 46 may be omitted if desired.

The outer members 16a and 16b are pivotally mounted to the base 12 by hinges 48 shown in FIGS. 1 and 2. Hinge components 50 are mounted to the exterior of the peripheral wall 40 of the base 12. The hinge components 50 cooperate with hinge components 52 provided on the outer member 16a (FIG. 1) and an elongate coupling pin (not shown) form the hinge 48. However, it is to be understood that different hinges or other types of pivotal connectors may be used to pivotally mount the outer members 16a, 16b to the base 12.

The inner frame 14a is shown particularly in FIGS. 2 and 4. Since frame 14b is substantially identical to frame 14a, only frame 14a will be described in detail with the description applying equally to frame 14b. The inner frame 14a includes an upper surface 60 and a lower surface 61 (FIG. 2) which is substantially identical to the upper surface. Similar to the base 12, the upper surface 60 includes a recessed central portion 62, a disk retainer 64 and a plurality of openings 66 to facilitate removal of the disk from the disk retainer. A frame wall 68 extends around the peripheral edge of the inner frame 14a. In the present embodiment, the frame wall 68 is preferably of a height such that the upper edge of the wall is coextensive with or extends above the upper surface of a disk positioned on the disk retainer 64.

A pair of mounting arms 70 extend outwardly from the frame wall 68, and are formed to cooperate with the mounting arms 44 on the base 12 to pivotally mount the inner frame 14a to the base. In the illustrated embodiment, the arms 70 each include an outward projecting pin 72 which seats in an aperture 74 (FIG. 3) formed in the mounting arms 44 on the base 12 to pivotally mount the frame 14a to the base 12. In other modifications of the invention, the mounting arm on the base may include a pin which seats in an aperture formed in the mounting arm on the inner frame. The mounting arms 44 and 70 may also be replaced with other suitable coupling devices for pivotally mounting the inner frame 14a to the base 12.

Support members 76 are provided on the side of the inner frame 14a opposite the mounting arms 70 to support the distal edge of the frame 14a in the closed position, ensuring that disks attached to the upper surface 18 of the base 12 and the lower surface 61 of the inner frame remain separated when the inner frame 14a is in the closed position. In this embodiment, the support members 76 are adapted to releasably engage the latching arms 46 on the base 12. As shown in FIG. 3, the latching arms 46 each include a protuberance 78 formed on the inner surface of the arm. The protuberance 78 seats in a recess 80 formed on the exterior of the support members 76 to retain the inner frame 14a in the closed position. In other modifications of the invention, only one of the support members 76 may be adapted to latch the inner frame 14a in the closed position, or other means may be used to releasably retain the inner frame 14a in the closed position. The protuberances 78 may be released from the recess 80 upon application of a slight lifting force to the inner frame 14a so that the inner frame 14a may be pivoted to the open position with minimal effort. The inner frame also includes an enlarged inner support member 82 which projects upwardly from the plane of the upper edge of the frame wall 68, forming a tab which may be gripped by the user to facilitate manipulation of the inner frame.

The outer member 16a is shown particularly in FIGS. 1 and 2. Since the outer members 16a and 16b are substantially identical, only outer member 16a will be described in detail with the description applying equally to the outer member 16b. As is shown in FIG. 1, the outer surface 90 of the outer member 16a may be contoured to provide the closed storage apparatus 10 with an aesthetically pleasing appearance. A logo plate 91 may be mounted to the outer surface 90 of member 16a. As with the base 12 and inner frame 14, the inner surface 92 of the outer member 16a includes a recessed central region 94 and a disk retainer 96 for releasably attaching disk to the outer member. Recesses 98 are formed in the inner surface 92 and extend inwardly into the recessed central region 94 to expose the edge of a disk attached to the retainer 94 for convenient removal of the disk from the outer member 16a.

A peripheral wall 100 projects upwardly from the inner surface 92 of the outer member 16. The peripheral walls 100 cooperate with the walls 40 of the base 12 to define the side edge of the casing as defined above. The cumulative height of the wall 100 of the outer member 16a and the peripheral wall 40 extending upwardly from the upper surface 18 of the base 12 is sufficient to enclose the inner frame 14a and the retained disks in the upper compartment 20 of the disk storage apparatus. The inner surface of the peripheral wall 100 is provided with a pair of latching members 102 which cooperate with latching members 104 on the base 12 to hold the outer members 16 in the closed position. In the illustrated embodiment, the latching member 102 is provided by a recess 106 formed in the peripheral wall and a protuberance 108 formed in the recess 104. The latching member 104 includes a tab 110 (FIG. 3) formed on the upper edge of the peripheral wall 40 of the base 12. The protuberance 108 engages an aperture 112 formed in the tab 110 to secure the outer member 16a in the closed position. Preferably, the engagement between the latching members 102 and 104 is sufficient to retain the outer member 16a in the closed position during normal handling of the disk storage apparatus. The outer member 16a may be opened by gripping the outer member and lifting it upwardly relative to the remainder of the apparatus. As is shown in FIG. 1, the outer surfaces of the peripheral walls 40 and 100 may be formed with recessed gripping members 114 to facilitate opening of the apparatus.

With the disk storage apparatus 10 shown in FIGS. 1–4, four disks may be retained in each of the upper compartment 20 and the lower compartment 24, with one disk attached to each of the upper and lower surfaces of the base 12, the upper and lower surfaces of the inner frames 14a and 14b, and the inner surfaces of the outer members 16a and 16b. The disks may be easily attached to one of the disk retainers 32, 64 and 94 by pressing the disk in place. The disk storage apparatus 10 is closed by first moving the inner frames 14a, 14b to the closed position, snapping the protuberances 78 into the recesses 80 to secure the inner frames 14a, 14b in the closed position. The outer members 16a, 16b are pivoted to the closed position, covering the inner frames 14a, 14b, respectively, snapping the protuberances 108 into the apertures 100 to secure the outer members 16a, 16b in the closed position. As is shown in FIG. 1, the disk storage apparatus 10 of the present invention provides a compact means of storing eight disks. When the apparatus is opened, the disks retained therein are readily available for viewing and/or easy removal of the disk from the apparatus. If the ability to hold a greater number of disks is desired, a greater number of inner frames may be employed. The additional inner frames may be pivotally attached to the inner frame 14a, 14b or to one of the other sides of the base 12. If additional inner frames are used, the height of one or both of peripheral walls 40, 100 must be increased and base and outer members may need to be enlarged.

FIG. 5 shows an alternative embodiment of the invention which is particularly suitable for retaining four disks. The disk storage apparatus 120 shown in FIG. 5 includes a base 122, an inner frame 124 pivotally coupled to the base 122 and an outer member 126 pivotally attached to the base 122. In the illustrated embodiment, the inner frame 124 and outer member 126 are substantially identical to the inner frame 14a and outer member 16a of the previous embodiment. The base 122 is similar to the base 12, differing in that the openings 38 have been replaced with recesses 128 similar to those formed in the outer member 16a. In addition, the lower surface 130 of the base 122 is contoured to form the outer casing of the disk storage apparatus. Thus, the disk storage apparatus 120 of FIG. 5 is similar to one compartment of the disk storage apparatus 10 of FIGS. 1–4.

As is apparent from the forgoing, the disk storage apparatus of this invention provides a convenient and compact storage system for retaining a plurality of disks within the convenient reach of the user. The user may easily locate and removal a selected disk for use. If desired, the outer casing the storage apparatus may include a flap or label where the user may identify the disks held within the apparatus. The disk storage apparatus is preferably molded of a plastic material using methods known in the art, and may be formed to any desired color or finish.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A disk storage apparatus for retaining a plurality of disks comprising:

a base having spaced first and second edges and third and fourth edges extending between said first and second edges;

at least one first retaining frame pivotally coupled to said base vicinal one of said edges thereof;

at least one second retaining frame pivotally coupled to said base vicinal another of said edges thereof;

a third retaining frame pivotally coupled to said base vicinal one of said edges thereof;

a fourth retaining frame pivotally coupled to said base vicinal another of said edges thereof; and a plurality of disk retainers adapted to engage a disk, at least one of said disk retainers being mounted to each of said retaining frames.

2. The disk storage apparatus of claim 1 in which said first retaining frame includes first and second disk retaining surfaces, said retaining surfaces each having one of said disk retainers mounted thereto.

3. The disk storage apparatus of claim 1 in which said first and second retaining frames are pivotal to a closed position with said retaining frames superimposed over said base, and further comprising at least one latch for retaining said retaining frames in the closed position.

4. The disk storage apparatus of claim 1 in which one of said disk retainers is mounted to said base.

5. The disk storage apparatus of claim 1 in which said base includes first and second disk retaining surfaces, said retaining surfaces each having one of said disk retainers mounted thereto.

6. The disk storage apparatus of claim 1 in which said disk retainers each include a plurality of fingers adapted to engage the central aperture of a disk.

7. The disk storage apparatus of claim 1 in which said third and fourth retaining frames are pivotal to a closed position with said retaining frames superimposed over said base, and further comprising at least one latch for retaining said third and fourth retaining frames in the closed position.

8. In combination, the disk storage apparatus of claim 1 and a plurality of disks, each of said disks being engaged by one of said disk retainers to removably mount said disks to said disk storage apparatus.

9. A disk storage apparatus for retaining a plurality of disks comprising:

a base having an upper surface and a lower surface, said upper surface and said lower surface each having first and second edges and third and fourth edges extending between said first and second edges;

first and second inner retaining frames coupled to said base, said first inner retaining frame being coupled to said base vicinal one edges of said upper surface and said second inner retaining frame being coupled to said base vicinal one of said edges of said lower surface, said first inner retaining frame being pivotal between a first position with said first inner retaining frame oriented at an angle relative to said base and a second position with said first inner retaining frame extending across said upper surface, said second inner frame being pivotal between a first position with said second inner retaining frame oriented at an angle relative to said base and a second position with said second inner retaining frame extending across said lower surface, each of said first and second inner retaining frames having a first side and a second side;

first and second outer members coupled to said base, said first outer member being coupled to said base vicinal another of said edges of said upper surface and said second outer member being coupled to said base vicinal another of said edges of said lower surface, said first outer member being pivotal between an open position with said first outer member oriented at an angle relative to said base and a closed position with said first outer member extending across said first inner retaining frame when said first inner retaining frame is in the second position extending across said base, said second outer member being pivotal between an open position with said second outer member oriented at an angle relative to said base and a closed position with said second outer member extending across said second inner retaining frame when said second inner retaining frame is in the second position extending across said base, each of said outer members having an inside and an outside; and disk retainers carried by said upper and lower surfaces of said base, said first side and said second side of said inner retaining frames, and said inside of said first and second outer members.

10. The disk storage apparatus of claim 9 in which said base member includes a pair of spaced arms projecting from each of said upper and lower surfaces, said inner retaining frames being pivotally coupled to said arms.

11. The disk storage apparatus of claim 9 in which said base member includes a pair of spaced arms projecting from each of said upper and lower surfaces, said inner retaining frames engaging said arms when said inner retaining frames are in the second positions extending across said upper and lower surfaces of said base, respectively, to hold said inner retaining frames in the second positions.

12. The disk storage apparatus of claim 9 in which said disk retainers each include a plurality of fingers adapted to engage the central aperture of a disk.

13. The disk storage apparatus of claim 9 and further comprising at least one latch associated with each outer member for retaining said outer members in the closed position.

14. In combination, the disk storage apparatus of claim 9 and a plurality of disks, each of said disks being engaged by one of said disk retainers to removably mount said disks to said disk storage apparatus.

* * * * *